United States Patent Office 3,737,357
Patented June 5, 1973

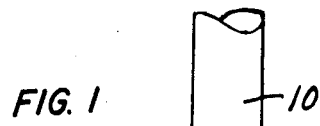
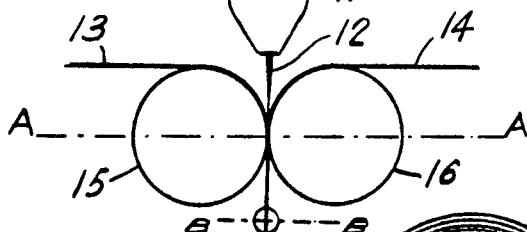
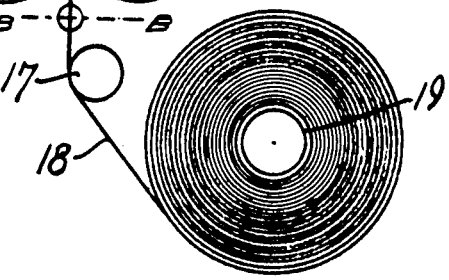
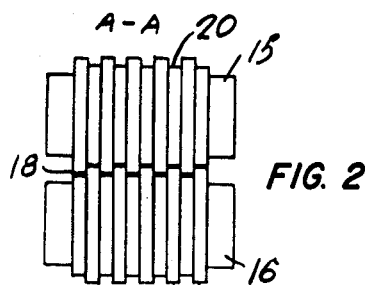
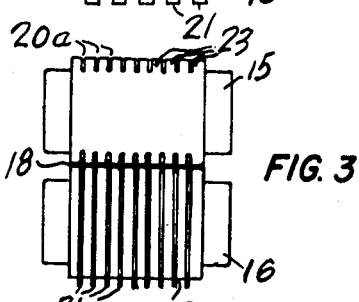
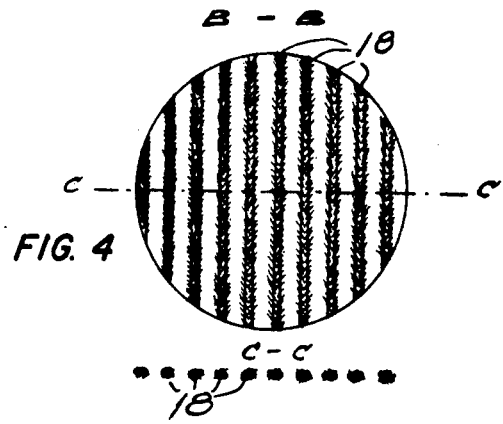
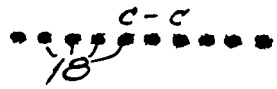

3,737,357
APPARATUS FOR FORMING FIBERTAPES

Emilian J. Bobkowicz and Andre Bobkowicz, both of 1435 St. Alexander St., Room 310, Montreal, Quebec, Canada
Original application May 14, 1968, Ser. No. 729,090, now Patent No. 3,567,545. Divided and this application Feb. 22, 1971, Ser. No. 117,716
Claims priority, application Canada, Sept. 26, 1967, 1,047
Int. Cl. B32b 31/18
U.S. Cl. 156—495          19 Claims

ABSTRACT OF THE DISCLOSURE

Apparatus for continuous production of fibertapes, with elimination of subsequent separate slitting operations comprising a pair of rotatable pressure rolls with continuous circumferential grooves on their surface, the rolls being so positioned side by side that each male member of the grooved surface of one roll fits into the corresponding female member of the other roll; and a method for producing fibertapes by introducing staple fibers and a polymeric bonding agent between such rotating grooved pressure rolls.

---

This application is a division of our co-pending application Ser. No. 729,090, filed May 14, 1968, now U.S. Pat. No. 3,567,545.

BACKGROUND OF THE INVENTION (1) Field of the invention

This invention relates to the production of fibertapes.

(2) Description of the prior art

It is known to manufacture fibertapes by contacting staple fibers with a suitable tacky polymer substrate, consolidating the resulting combination by passing it through a pair of smooth pressure rolls to form a web and slitting said web into tapes of desired width.

These basic steps of fibertape production have always remained the same, although many improvements have been incorporated thereto depending on the properties of the desired tape and its ultimate use. Thus, the consolidating step may be accompanied by heating and/or cooling operations. As adhesive material there may be employed polymeric materials having different desirable properties (e.g. insulating, strengthening, etc.); these materials may also be subjected to additional treatments such as molecular orientation and the like.

For example applicants' own U.S. Pat. No. 3,347,727 of Oct. 17, 1967 discloses a method for the production of textured filament yarn, which involves as an intermediate step the formation of composite fibertapes or ribbons. According to this method, a soft layer of resin is extruded through an extrusion head, stretched in the longitudinal direction to cause orientation of the resin molecules, contacted while still tacky with a fibrous web or the like on one or both sides thereof, then the resulting combination is pressed by a pair of rolls with simultaneous cooling to form a composite web which is finally slit longitudinally into a plurality of tapes. The latter are subsequently transformed into yarn by means of a twisting operation.

It is also disclosed in this patent that the extruded layer of resin may be in the form of a film or of a plurality of parallel filaments.

One will readily realize that this particular method equally comprises the above mentioned basic characteristics, namely consolidation by a pair of smooth pressure rolls to obtain a composite web and slitting the latter into tapes.

These two basic features have significant disadvantages.

First, the consolidation of the polymeric substrates or resin with staple fibers by a pair of smooth pressure rolls makes it extremely difficult to properly control the shape and surface characteristics of the resulting tape. What actually occurs is that the polymeric substrate or any other adhesive passing together with staple fibers between two smooth pressure rolls is squeezed thereby so that there is a definite flow of the substrate toward the sides of the rolls. The fibers which are in contact with the substrate also tend to flow sideways therewith and the resulting tapes will have a heavy fibrous texture while others will consist almost entirely of the polymeric substrate. This unevenness of shape, composition and surface texture is of course very undesirable.

If the polymeric substrate or resin is introduced between the rolls in the form of a plurality of filaments, then each filament will be squeezed and will result in a narrow strip; the fibers will mainly attach at the side of each strip, some of them providing interconnection from one strip to another. However, the middle of each strip will remain almost entirely fiberless. The surface of the resulting web will therefore mainly consist of longitudinal fibrous strips and of resinous substantially fiberless strips inbetween. When this web is slit to form tapes, the latter will more often than not have a very uneven composition and surface structure unacceptable for many applications.

Thus, with the use of conventional smooth pressure rolls, the control of the surface characteristics as well as of other properties, such as the fiber density distribution, the amount of fibers and polymer per tape, etc., is rather difficult and it is almost impossible to obtain, in this way, fibertapes having a polymeric core uniformly covered with staple fibers.

Second, the web slitting operation which is carried out with conventional methods and machinery, including the method disclosed in the above mentioned applicants' U.S. Pat. No. 3,347,727 is in itself a rather difficult procedure especially for the production of narrow light weight tapes capable of being transformed into yarn or used as such.

For example, if an extrusion technique is used for tape production, the polymeric substrate or resin may easily be extruded at speeds well over 200 ft./min. Practical extrusion speeds may even reach 1000 ft./min. The fibrous material may also be supplied at any predetermined speed. However, slitting of the resulting web at such speeds can constitute a serious technological obstacle. Since the obtained web has a fibrous or flimsy structure, it does not render itself well to slitting at speeds over 40–50 ft./min. without seriously damaging or even destroying the tapes. Actually one would exclude speeds at 200 ft./min. and over for properly slitting such fibrous webs.

For this reason the slitting operation is economically disadvantageous in the fibertape manufacture. It slows down the whole process and is definitely incompatible with the speeds of modern textile machinery. It must be performed separately from the other tape forming operations and hence an additional cost and disadvantage.

SUMMARY OF THE INVENTION

An object of the present invention is therefore to provide a process and an apparatus which will enable easily to control the surface texture characteristics, the structure and other properties of the composite fibertapes and, besides, will eliminate the slitting operation altogether as a separate step by combining the separation of the individual tapes with the tape forming operation, thus overcoming the above mentioned disadvantages.

Another object of the invention is to provide a process and an apparatus which will make it possible to produce under controllable conditions, at high speeds and with great efficiency fibertapes having substantially even surface texture and fiber and polymer distribution of the composite structure.

Still another object of the instant invention is to provide a method and an apparatus which will be compatible with modern extrusion techniques in fibertape manufacture.

Further objects and advantages of the invention will be made evident from the following more detailed description thereof.

Generally, the method according to the present invention comprises introducing staple fibers and a tacky polymer substrate inbetween a pair of rotating grooved pressure rolls with continuous circumferential grooves (preferably of square cross section) on their surface, said rolls being so positioned face to face that each male member or knife of the grooved surface of one roll fits into the corresponding female member or groove of the other roll thus forming cutting edges for the separation of the staple fiber webs while the tapes are produced. In this manner there is formed within each groove a closed space or cavity in which the polymer is continuously compressed together with staple fibers, if necessary with cooling, to effect consolidation. Each such space or cavity is used to form a separate tape and it can be compared to a molding cavity in which under compression the final molding of the shape takes place. This enables an easy control of the operation within each space or cavity at the time of consolidation, i.e. control of the amount of polymer and fibers to be introduced into each space or cavity, of the depth of each cavity, of the compression to be applied to restrict the fiber distribution and polymer flow within said cavity at the nip of the rolls.

The resulting separate tapes will have a width defined by the grooves of the rolls, they will possess improved inter blending of fiber and polymer and controlled surface and blend characteristics and will need on separate slitting when they are delivered by the grooved pressure rolls already operated.

The novel method is particularly well applicable for the production of narrow tapes, e.g. ¼ inch wide or narrower.

It is, of course, unnecessary that the grooves of each roll be of equal width. Actually one roll may be provided with varying in width grooves with corresponding in width members or cutters adapted to enter said grooves. In addition one roll may be provided with very narrow gooves while the other will have corresponding narrow male members or cutters adapted to enter such grooves. Under such conditions the width of each of the resulting tapes will substantially correspond to the width between the cutters.

In a preferential embodiment of the invention, the polymer substrate consists of a layer of resin in the form of directly extruded film or parallel strands of any desired shape (e.g. round filaments, square strands, etc.), which layer while still tacky is contacted on one or both sides thereof with a layer of loosely held staple fibers and then introduced inbetween the grooved rolls of the type described above, which are driven at a speed higher than the extrusion speed of the resinous layer. This enables to produce fibertapes with the above mentioned advantages and, furthermore, having a resinous substantially oriented in the longitudinal direction due to stretching of the layer of resin by the rapidly rotating grooved rolls.

The improved apparatus according to the present invention comprises, instead of the usual flat surface smooth pressure rolls, a pair of grooved rolls such as those described above. Separate slitting means are therefore entirely eliminated.

It is to be noted that the novel apparatus enables the manufacture of ready fibertapes at speeds much in excess of those which were formerly possible because of the elimination of separate slitting means and operations. It provides a solution of dividing the composite fibrous material and polymer substrate into separate tapes of desired width right at the moment of their contact with each other and their consolidation.

The tapes are indeed in their final form as they come out of the grooved rolls and may simply be collected on a suitable wind-up roll.

BRIEF DESCRIPTION OF THE DRAWINGS

Several non limitative embodiments of the invention will now be described with reference to the appended drawings in which:

FIG. 1 diagrammatically represents the basic principle of a preferred embodiment of applicants' novel tape making process and apparatus;

FIG. 2 is a top view of line A—A of FIG. 1, showing the engagement of the grooved rolls according to this invention;

FIG. 3 is another top view at line A—A of FIG. 1, showing an alternative design of the grooved rolls according to the invention;

FIG. 4 is an enlarged view at line B—B of FIG. 1 showing the tapes obtained according to the present invention;

FIG. 5 is a cross-section along line C—C of FIG. 4, showing, in section, the tapes obtained;

It should be noted that same reference numbers are employed to identify same parts in all figures of the drawings.

DESCRIPTION OF THE PREFERRED EMBODIMENTS

Figure 6:
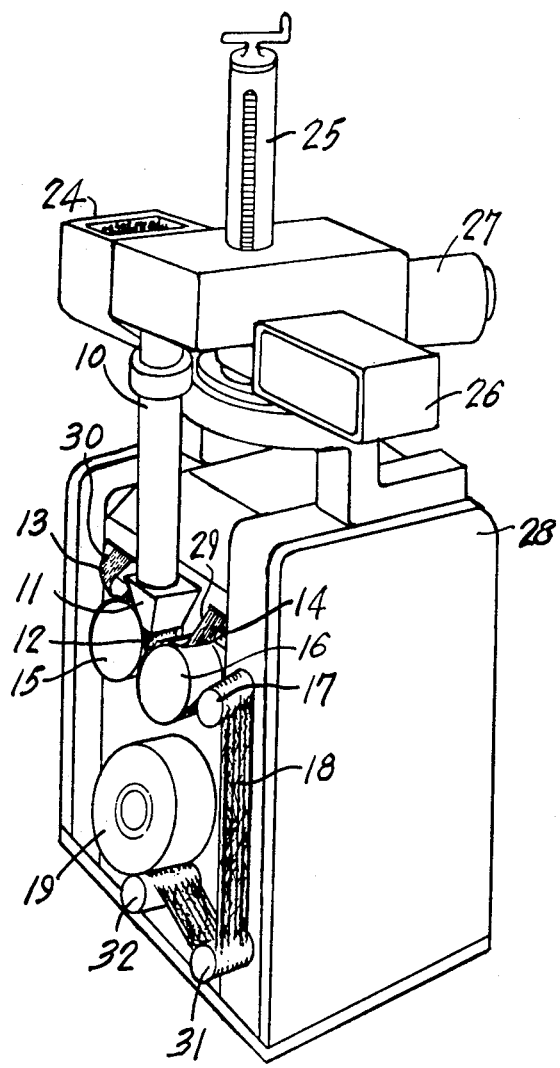
FIG. 6 is a perspective view of a basic tape making apparatus adapted to be used according to the present invention.

In FIG. 1 extruder 10, with extruder die 11, is used to extrude a curtain of strands 12 which curtain is then picked up by a pair of grooved rolls 15 and 16 while being contacted, at the nip of said rolls, with layers of loosely held staple fibers 13 and 14. The resulting series of tapes 18 are guided and held under tension by roller 17 and then wound on roll 19. Depending on the desired properties of the fibertapes, the employed staple fibers may be arranged in a substantially parallel manner or at random.

The grooved rolls 15 and 16 can be of a type such as shown in FIG. 2, having square shaped grooves 20 adapted to receive corresponding square shaped protruding members of knives 21. The grooves on roll 15 need not be of the same size as those on roll 16, and this may result in a situation illustrated in FIG. 3 where grooves 20a of roll 15 are very narrow and are adapted to receive narrow protruding members or cutters 21a of roll 16 thereinto. On the other hand the grooves or spacers 22 of roll 16 in FIG. 3, are much wider and actually control the ultimate width of the resulting tapes; the protruding shoulders 23 of roll 15 are also correspondingly wider and are adapted to fit into the grooves 22.

Fibertapes 18 are individually bonded and consolidated in spaces between grooves 20 and knives 21 of FIG. 2 and grooves 22 and shoulders 23 of FIG. 3; in the latter case members 21a are solely used as cutters, while shoulders 23 are used for compressing and consolidating the tapes.

Rolls 15 and 16 may be of steel or any other suitable material.

In FIGS. 4 and 5 the resulting fibertapes 18 with a regular fiber distribution on their surfaces, are shown in an enlarged manner.

FIG. 6 represents a simple combination according to an embodiment of the present invention wherein a suitable polymer is introduced into the extruder 10 through feed hopper 24. The extruder is operated by motor 27 and its position relative to the rolls 15 and 16 is adjusted by means of the height adjusting column 25. The operating conditions of the apparatus are controlled by the instrumentation panel 26.

The curtain of polymer strands 12 is extruded through the extruder die 11 and is picked up by the grooved pressure rolls 15 and 16 of a design such as illustrated in FIGS. 2 and 3. At the same time there are introduced inbetween said grooved rolls 15 and 16, on both sides of the curtain 12, layers 13 and 14 of loosely held staple fibers properly directed toward the nip of said grooved rolls by means of deflecting or distributing plates 29 and 30. Rolls 15 and 16 are driven at a speed substantially higher than the extrusion rate of the polymer curtain 12 upon the die to achieve stretching and molecular orientation of the latter, but the polymer is still in tacky condition during its contact with the staple fibers at the nip of said grooved rolls. The resulting tapes 18, separated at the nip point of the grooved rolls, are of the type illustrated in FIGS. 4 and 5; they pass over the guide and tension rolls 17 and 31, and are wound on collecting roll 19 with the help of a proper pressing roller 32. The entire combination may be designed in the form of a handy and compact apparatus placed within a frame 28.

Figure 7:
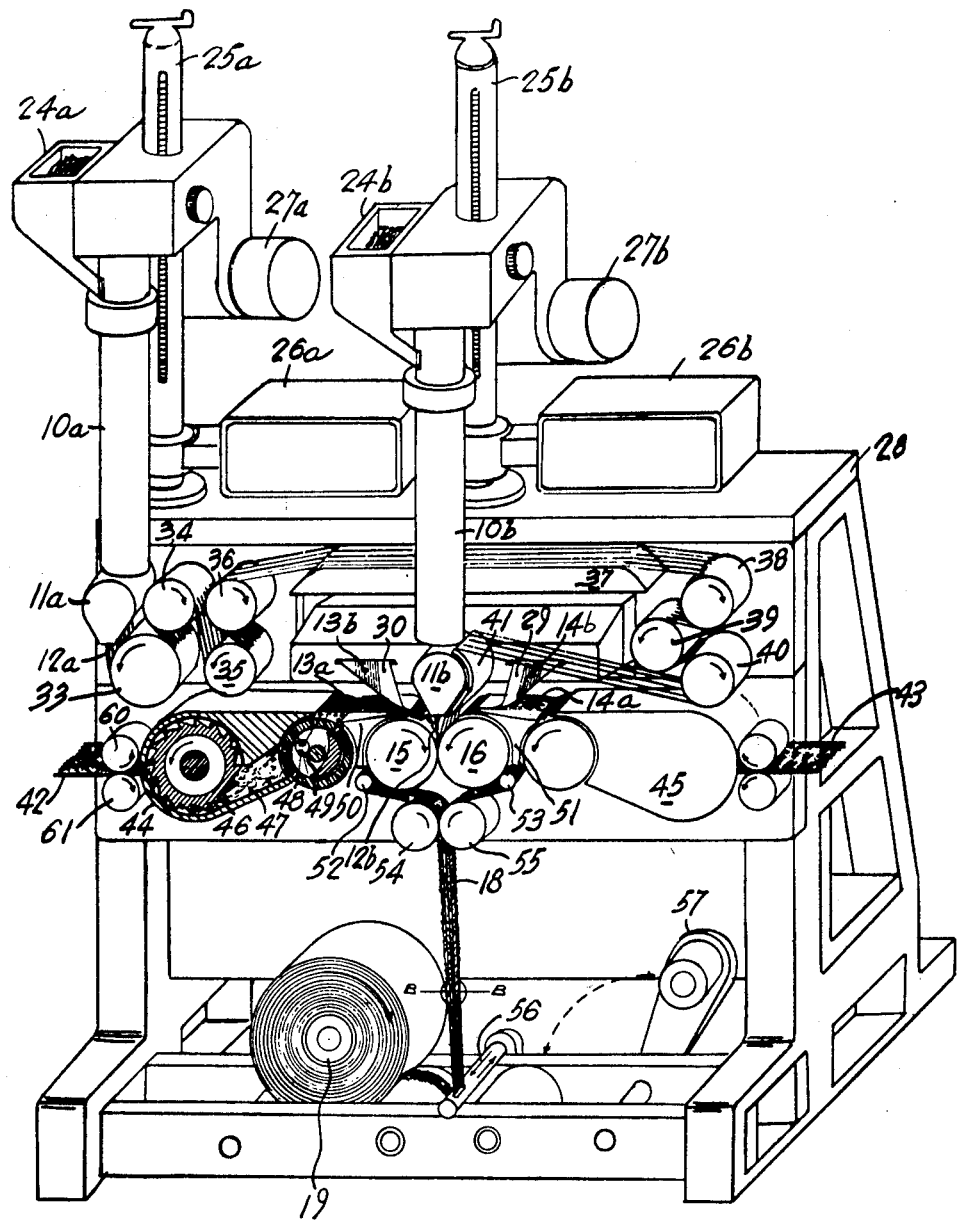
FIG. 7 is a perspective view of a more detailed tape making installation adapted to be used according to the present invention.

FIG. 7 shows a somewhat more complex device with two extruders 10a and 10b comprising respective extruder dies 11a and 11b. According to this particular embodiment, a thermoplastic resin is introduced into hopper 24a and therefrom passes into the extruder 10a. The extruder is driven by motor 27a and its position is adjusted by cylinder 25a. The different operating conditions are indicated and controlled by the instrumentation panel 26a.

The polymer extruded from the extruder die 11a, in the form of a curtain of parallel strands 12a, is cooled and consolidated by roll 33 held at a controlled temperature and then gripped and forwarded by a first set of godet rolls 34, 35 and 36. Said first set of godet rolls, including roll 33, operate at a faster surface speed than the speed of extrusion of the strands 12a issuing from the die 11a, thus achieving the first partial degree of orientation in the polymer. To accomplish a fuller degree of orientation, the partially oriented polymer curtain is passed over a heater 37 to heat it up again to a controlled degree, and is gripped again by a second set of godet rolls 38, 39 and 40, said second set of godet rolls operating at a controllable substantially higher surface speed than the said first set of godet rolls (from 3 to 10 times faster for instance) and thus stretching said curtain of strands 12a between said first and second sets of godet rolls, while said curtain 12a is being heated thus obtaining the final and full desired degree of molecular orientation in said strands. The final degree of orientation is controlled by the temperature of the polymeric strands at stretching and the ratio of surface speeds of the second to first sets of godet rolls.

At the same time a polymer, which may be the same or different from the one extruded by extruder 10a, is supplied from hopper 24b into a second extruder 10b. This extruder is driven by motor 27b and its position relative to rolls 15 and 16 is adjusted by height adjusting cylinder 25b. The operating conditions of this extruder are controlled by means of the instrument box 26b.

A second curtain of strands 12b is thus extruded from extruder die 11b and into the nip of a pair of grooved pressure rolls 15 and 16. This second curtain 12b is combined with the first curtain 12a which has been oriented to the fullest possible extent before both curtains are picked up by the grooved pressure rolls 15 and 16. The strands of the first curtain 12a are preferably made to fall inbetween those of the second curtain 12b. In order to impart some tackiness to the curtain 12a, the latter may be warmed up by passing it over a heated deflecting plate 41. Also it is sufficient to deflect this first curtain close to the hot extruder die 11b to soften it and to impart some tackiness thereto.

The so combined first and second curtains 12a and 12b are then contacted on both sides thereof, at the nip of the grooved pressure rolls 15 and 16, with layers of loosely held staple fibers 13a and 14a which come out of fiber disintegrating devices 44 and 45 and are forwarded toward the nip of the grooved pressure rolls by means of supporting members 50 and 51. The obtained combination is pressed and consolidated as already described above and the resulting tapes 18 pass alternatively over stripping rolls 52 and 53 for easier separation, then they are brought together at the nip of a pair of smooth pull rolls 54 and 55, if necessary with some additional longitudinal stretching, and finally wound on a large collecting roll 19 after passing through a slot of a guiding member 56.

The obtained fibertapes have excellent longitudinal strength in view of the fact that they contain some strands 12a which have been oriented to the fullest extent, while strands 12b have been used mainly for imparting tackiness to enable interbonding and consolidation of the staple fibers with the strands.

The fibers which are contacted with the polymer strands to form the fibertapes have been produced from fiberwebs 42 and 43 which may consist of a same or different material. The manner in which the web is disintegrated into fibers is described herebelow for web 42 only in the form of a non limitative example.

Thus, web 42 is pulled by rolls 60 and 61 into disintegrating device 44 where it is broken down into fibers by means of licker-in rolls 46. The resulting fibers are then sucked through passage 47 onto the surface of a perforated drum 48 by a stationary suction device 49 positioned within said drum. The layer of loosely held fibers 13a resulting on said drum 48 is then transmitted via support member 50 by the rotation of the drum 48 toward the nip of said grooved pressure rolls 15 and 16. A more detailed description of this staple fiber producing, positioning and forwarding arrangement has been made in applicants' Canadian Pat. No. 747,101 of Nov. 29, 1966.

An alternative or additional fiber web supply embodiment is also described below in the form of a non limitative example. The layers of loosely held fibers 13a and 14a described above are at random arranged because of the inherent properties of the licker-in device 44 which is used. Substantially parallel arranged webs of staple fibers may be desired in addition to or in lieu of at random arranged layers 13a, 14a, and such webs 13b, 14b with parallel arrangement of fibers may be supplied by means of a standard textile drawframe arrangement embodied within the apparatus but not illustrated here in detail.

The entire combination may be embodied within frame 28 to form an efficient fibertape producing apparatus constituting one embodiment of the present invention. Additional winder 57 may also be provided for automatically changing collecting rolls 19, and thus operating the apparatus continuously, since the resin and fiber supplied are fed in on a continuous basis.

Figure 8:
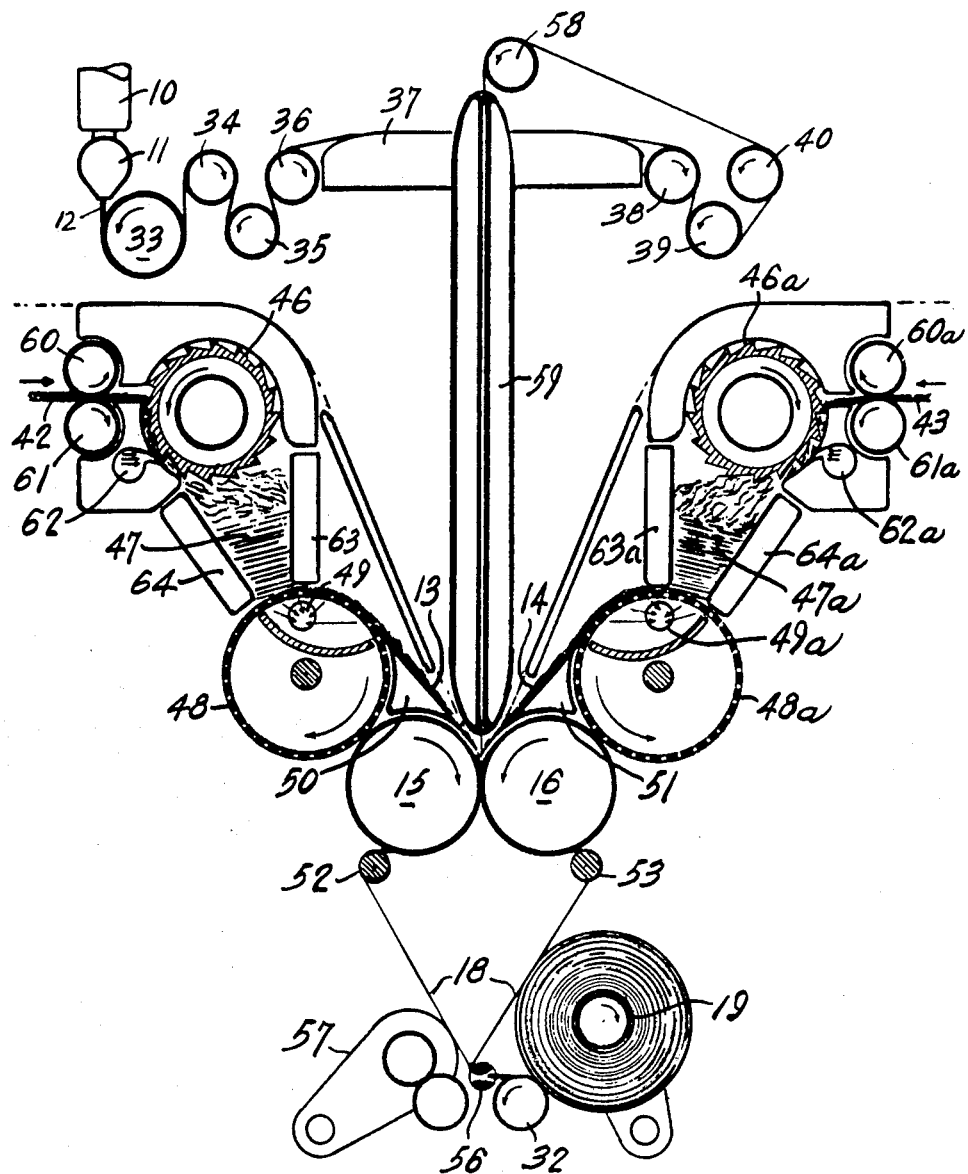
FIG. 8 is a diagrammatic view of another apparatus suitable to be used for the fibertape manufacture according to this invention.

FIG. 8 shows a still further embodiment of the present invention. According to this embodiment a layer 12 of a thermoplastic polymeric material is extruded through the extrusion die 11 of extruder 10. The layer 12, which may be in the form of a film or plurality of parallel filaments or strands of any configuration, is then stretched between the die 11 and the first set of godet rolls 34, 35, and 36, including the consolidation roll 33, and further stretched between said first set of godet rolls and a second set of godet rolls 38, 39 and 40, while being warmed up over heater 37, so as to achieve orientation and strength of the polymeric material in a similar manner as described above for FIG. 7. Thereupon, the oriented polymeric layer 12 is guided over roller 58 and into and through a heater 59 with controlled temperature conditions. The temperature in this heater is such as to enable the polymeric material to acquire surface tackiness substantially without losing its inner molecular orientation.

The so treated polymeric layer is then introduced, as in previous cases, inbetween two grooved pressure rolls 15 and 16 together with layers of staple fibers 13 and 14 at each side thereof. The resulting fibertapes 18 are then alternatively passed over stripping rolls 52 and 53 for easier separation and after being properly guided by the guiding member 56 they are wound on the collecting roll 19. Device 57 is intended to provide an alternative collecting roll when the first one is full.

Although layers 13 and 14 of staple fibers can be formed by any suitable means, in this particular embodiment they are obtained by disintegration of fiberwebs into individual fibers and electrostatic parallelization of the resulting fibers as already described and claimed in applicants' copending U.S. patent application No. 461,912 of June 7, 1965.

This is done by breaking up the webs 42 and 43 of staple fibers, which can be of same or different nature, by means of licker-in rolls 46 and 46a after said webs have been introduced into the disintegrating chambers by supply rolls 60, 61 and 60a, 61a respectively. The disintegrated fibers 47, 47a are carried by a source of compressed air 62, 62a inbetween two pairs of converging electrodes 63, 64 and 63a, 64a respectively where they are parallelized by the converging electrostatic field. The resulting parallel arranged fibers are then deposited by suction on perforated rotating drums 48, 48a provided with suction devices 49, 49a therewithin and are forwarded toward the nip of grooved pressure rolls 15, 16 with the help of supporting members 50, 51.

The basic apparatus for fibertape manufacture according to one preferred embodiment of this invention will comprise:

(a) a pair of rotatable grooved pressure rolls 15 and 16 provided with continuous circular grooves on their surface and positioned face to face so that each male member of the grooved surface of one roll fits into the corresponding female member of the other roll, and the sharp edges of which simultaneously act as cutters for separation of each tape;

(b) means (extruder 10 and extruder die 11) for extruding a layer of resin 12, in the form of a film or of a curtain of parallel strands, toward the nip of said grooved pressure rolls 15 and 16;

(c) means for simultaneously supplying a layer of loosely held staple fibers 13 and/or 14 toward the nip of said grooved pressure rolls on at least one side of the extruded layer of resin;

(d) means for rotating the grooved pressure rolls preferably at a higher speed than the rate of extrusion of the layer of resin so as to pick up said layer of resin and stretch it in longitudinal direction to cause molecular orientation of said resin; and (e) means for separating and collecting the fibertapes obtained through consolidation of the layer of resin with the staple fibers within the grooves of the pressure rolls.

One will easily realize that this apparatus does not necessitate any separate slitting means.

If desired, the grooved pressure rolls may be provided with a cooling arrangement to assist the coagulation of the extruded resin during its consolidation with the staple fibers.

In addition there may also be provided means for proper distribution of the staple fibers at the nip of the grooved pressure rolls, enabling control of the fibrous surface texture of the resulting tapes.

A more complex fibertape producing apparatus according to another embodiment of the invention will comprise:

(a) a first extruder 10a adapted to extrude a first curtain of thermoplastic strands 12a.

(b) means for stretching said strands in longitudinal direction to cause their fullest possible molecular orientation;

(c) a second extruder 10b adapted to extrude a second curtain 12b of polymeric strands;

(d) means for combining said first curtain 12a with said second curtain 12b so that the strands of the latter will be in staggered relation with respect to those of the former and form a single combined curtain of parallel filaments;

(e) a pair of rotatable grooved pressure rolls 15 and 16 provided with continuous circular grooves on their surface and positioned face to face so that each male member of the grooved surface of one roll fits into the corresponding female member of the other roll and the sharp edges of which act as tape separation means;

(f) means for supplying the combined curtain of parallel strands toward the nip of said pressure rolls 15 and 16 while a least some of them in each groove are in tacky condition;

(g) means for disintegrating two solid fiberwebs, one on each side of the combined curtain of parallel strands, into individual loosely held staple fibers;

(h) means for forwarding the loosely held staple fibers toward the nip of said grooved pressure rolls 15 and 16 with proper distribution;

(i) means for rotating the grooved pressure rolls so as to pick up the combined curtain of strands together with the loosely held staple fibers to separate and consolidate the same; and (j) means for collecting the resulting fibertapes 18 coming out of the grooved pressure rolls.

In this particular embodiment, the means for stretching the strands extruded from the first extruder may consist of two sets of well known godet rolls with a suitable heater inbetween. Thus, the curtain of thermoplastic resin is stretched once to effect partial orientation, then it is heated and stretched once again to complete said orientation.

The means for disintegrating two solid fiberwebs into loosely held fibers and forwarding the latter, with proper distribution, toward the nip of the grooved pressure rolls, may consist of licker-in rolls and perforated drums such as those illustrated in FIG. 7 and described above and/or of a conventional standard drawframe.

Finally, according to still another embodiment of the invention there may be provided a fibertape making apparatus comprising:

(a) an extruder adapted to extrude a layer of thermoplastic resin in the form of a film or of a curtain of parallel strands;

(b) means for stretching said layer of resin in longitudinal direction to cause its fullest possible orientation;

(c) a heater, preferably of tunnel type, with means for precise control of temperature therein;

(d) means for passing the oriented layer of resin through said heater, so as to soften the surface thereof while maintaining its inner molecular orientation;

(e) a pair of rotatable grooved pressure rolls provided with continuous circular grooves on their surface and positioned face to face so that each male member of the grooved surface of one roll fits into the corresponding female member of the other roll and the sharp edges of which act as tape separation means;

(f) means for forwarding the softened layer of resin toward the nip of said grooved pressure rolls;

(g) means for disintegrating two solid fiberwebs, one on each side of the softened layer of resin, into individual loosely held staple fibers;

(h) means for supplying the loosely held staple fibers toward the nip of said grooved pressure rolls with proper distribution;

(i) means for rotating the grooved pressure rolls so as to pick up the softened layer of resin together with loosely held staple fibers to separate and consolidate the same; and (j) means for collecting the resulting separate fibertapes.

It has been experimentally found that it is possible, by passing an oriented layer of thermoplastic material in a heater with accurate temperature control and by suitably controlling the temperature, to soften and render tacky the surface of said layer without substantially affecting the layer's inner crystallinity and orientation. The temperature necessary to achieve this condition varies for each particular material, as well as the mass of the layer being processed per unit time where the amount of heat applied to the material naturally produces a transient temperature gradient in its cross-section. The necessary heat input level can be easily experimentally determined in each case, and controlled to achieve the surface temperature at which tackiness occurs for a given material while maintaining the core at a lower temperature. This finding is the basis for the above described embodiment of the present invention, which is illustrated in FIG. 8.

In all these embodiments the grooves of the pressure rolls are of substantially square cross section. Also the extruders preferably operate at pressure of about 500–10,000 p.s.i., a typical operating extrusion pressure is about 2,000 p.s.i.

The tapes obtained according to the instant invention may have many uses. For example, they may be transformed into yarn or they may be employed as such in some textile application, e.g. weaving, knitting, braiding etc.

The polymer substrate, which is one of the constituents of the obtained fibertapes, may consist of any extrudable polymer resins or their blends. The thermoplastic resins which are especially suitable are of polyamide, polyester and polyolefin type (e.g. nylon, polyethylene, acrylonitrile, etc.).

The staple fibers may consist of wool, cotton, bast fibers, man-made fibers and mixtures thereof.

It should, of course, be understood that the invention is not limited to the specifically described embodiments but that many modifications evident to those skilled in the art can be made without departing from the spirit of the invention and the scope of the following claims.

We claim:

1. Apparatus for producing multicomponent fibertapes comprising: a pair of rotatable grooved pressure rolls with continuous circumferential grooves, said rolls being so positioned face to face that each male member of the grooved surface of one roll fits into the corresponding female member of the other roll to form at the nip point of said rolls cavities which are adjustable in depth, means for introducing staple fibers and means for introducing a polymer substrate in tacky condition between said rolls and into said cavities for separation of the resulting composite fiber-polymer material into a plurality of tapes; means for pressing said rolls against each other; means for adjustable regulation of the depth of the created cavities to assure the consolidation of each tape under controlled conditions; and means for rotating said rolls in their preset and pressed condition.

2. Apparatus according to claim 1, in which the circumferential grooves of said rolls are of substantially square cross-section.

3. Apparatus according to claim 1, in which the grooves of said rolls are at most ¼ inch in width.

4. Apparatus according to claim 1, in which the grooves on one roll are very narrow and serve to receive correspondingly narrow cutters on the other roll on which the grooves are wider and serve to determine the width of the resulting fibertapes.

5. Apparatus according to claim 1, in which the means for introducing staple fibers and polymer substrate in-between said grooved rolls also comprises means for controlling the amounts of these materials going into each groove of the rolls.

6. Apparatus according to claim 1, in which means are further provided for controlling the temperature of the grooved pressure rolls.

7. Apparatus for producing fibertapes comprising:

(a) a pair of rotatable grooved pressure rolls provided with continuous circumferential grooves with sharp edges and positioned face to face so that each member of the grooved surface of one roll fits into the corresponding female member of the other roll to form at the nip point of said rolls cavities which are adjustable in depth;

(b) means for adjusting the depth of said cavities;

(c) extruder means for extruding a layer of resin in the form of a film or of a curtain of parallel strands toward the nip of said grooved pressure rolls;

(d) means for simultaneously supplying a layer of loosely held staple fibers toward the nip of said grooved pressure rolls on at least one side of the extruded layer of resin;

(e) means for rotating the grooved pressure rolls so as to pick up, separate and consolidate the polymer layer with the staple fibers within said grooves in the form of separated fibertapes;

(f) and means for collecting the resulting bonded fiber-tapes.

8. Apparatus according to claim 7, in which the means for rotating the grooved pressure rolls are adapted to rotate said rolls at a higher speed than the rate of extrusion of the layer of resin so as to stretch the latter and cause its partial molecular orientation.

9. Apparatus for producing fibertapes comprising:

(a) a firsit extruder means adapted to extrude a first curtain of extrudable polymeric strands;

(b) means for stretching said first curtain of strands in the longitudinal direction to cause molecular orientation thereof;

(c) a second extruder means adapted to extrude a second curtain of tacky polymeric strands;

(d) means for combining said first curtain with said second curtain so that the strands of the latter will be in staggered arrangement with those of the former;

(e) a pair of rotatable grooved pressure rolls provided with continuous circumferential grooves on their sur- the corresponding female member of the other roll face and positioned face to face so that each male member of the grooved surface of one roll fits into the corresponding female member of the other roll to form at the nip point of the rolls adjustable in depth cavities;

(f) means for adjusting the depth of said cavities;

(g) means for supplying the combined curtain of parallel strands with at least some of them in tacky condition toward the nip of said grooved pressure rolls and so that at least one oriented and at least one tacky strand go into each groove;

(h) means for disintegrating a fiberweb, on at least one side of the combined curtain of parallel strands into individual loosely held staple fibers;

(i) means for forwarding the losely held staple fibers toward the nip of said grooved pressure rolls;

(j) means for rotating the grooved pressure rolls so as to pick up and consolidate the combined curtain of strands and the loosely held stape fiber and simultaneously to subdivide the composite material into a plurality of consolidated fiber-polymer tapes; and (k) means for collecting the resulting composite fiber-tapes.

10. Apparatus according to claim 9, in which the means for stretching the first curtain of polymeric strands consists of two sets of godet rolls with a heater in between.

11. Apparatus for producing fibertapes comprising:

(a) extruder means adapted to extrude a layer of extrudable resin in the form of a film or of a curtain of parallel strands;

(b) means for stretching said layer of resin in longitudinal direction to cause molecular orientation thereof;

(c) a heater with accurate temperature control;

(d) means for passing the oriented layer of resin in said heater and controlling the temperature so as to soften and render tacky the surface of the resin while maintaining its inner molecular orientation;

(e) a pair of rotatable grooved pressure rolls provided with continuous circumferential grooves on their surface and positioned face to face so that each male member of the grooved surface of one roll fits into the corresponding female member of the other roll to form at the nip point of the rolls adjustable in depth cavities;

(f) means for controlling the depth of said cavities;

(g) means for forwarding the softened layer of resin toward the nip of said grooved pressure rolls;

(h) means for disintegrating a fiberweb on at least one side of the softened layer of resin into individual loosely held staple fibers;

(i) means for supplying the loosely held staple fibers toward the nip of said grooved pressure rolls;

(j) means for rotating the grooved pressure rolls so as to pick up and consolidate the softened layer of resin with the staple fibers and to simultaneously subdivide said composite material into a plurality of consolidated fiber-polymer tapes; and (k) means for collecting the resulting composite fibertapes.

12. Apparatus according to claim 11, in which the means for stretching the layer of resin consists of two sets of godet rolls with a heater inbetween.

13. Apparatus according to claim 11, in which the extruder means comprise a pressure extruder.

14. Apparatus according to claim 11, in which the grooves of the grooved pressure rolls are of substantially square cross-section.

15. Apparatus according to claim 11, in which the grooves of the grooved pressure rolls are at most ¼ inch wide.

16. Apparatus according to claim 11, in which the grooves on one pressure roll are very narrow and serve to receive correspondingly narrow cutters on the other pressure roll on which the grooves are wider and serve to determine the width of the resulting fibertapes.

17. Apparatus according to claim 11, further comprising means for controlling the temperature of the grooved pressure rolls.

18. Apparatus according to claim 11, in which the means for disintegrating a fiberweb into individual staple fibers consists of licker-in rolls and further comprises a perforated rotatable drum with a suction device therein for sucking the individual fibers onto said drum and evenly distributing them thereon prior to their being forwarded toward the nip of the grooved pressure rolls.

19. Apparatus according to claim 11, in which the means for distintegrating a fiberweb into individual staple fibers consists of licker-in rolls and further comprises a pair of converging electrodes for parallelizing the individual fibers in the converging electrostatic field therebetween prior to their forwarding toward the nip of the grooved pressure rolls.

References Cited
UNITED STATES PATENTS

| | | | |
|---|---|---|---|
| 3,347,727 | 10/1967 | Bobkowicz et al. | 156—244 X |
| 2,052,151 | 8/1936 | Van Voorhis | 156—27 X |
| 3,493,452 | 2/1970 | Cole | 156—512 X |
| 3,343,370 | 9/1967 | Twele et al. | 156—298 X |

ALFRED L. LEAVITT, Primary Examiner

C. WESTON, Assistant Examiner

U.S. Cl. X.R.

156—244, 269, 271, 494, 500, 501, 518